United States Patent [19]
Nishitani

[11] Patent Number: 5,768,092
[45] Date of Patent: Jun. 16, 1998

[54] CLUSTER MODULE AND ITS ASSEMBLING METHOD

[75] Inventor: Keizo Nishitani, Shizuoka, Japan

[73] Assignee: Yazaki Corporation, Tokyo, Japan

[21] Appl. No.: 731,927

[22] Filed: Oct. 18, 1996

[30] Foreign Application Priority Data

Oct. 19, 1995 [JP] Japan ............................ 7-271318

[51] Int. Cl.$^6$ ...................................................... H02B 1/01
[52] U.S. Cl. .......................... 361/627; 307/10.1; 361/749; 361/826
[58] Field of Search .................. 174/71 R, 72 A, 174/72 R; 307/10.1, 147, 148; 361/627–629, 749, 826; 439/34

[56] References Cited

U.S. PATENT DOCUMENTS

| | | | |
|---|---|---|---|
| 4,831,278 | 5/1989 | Ueda et al. | 307/10.1 |
| 5,255,155 | 10/1993 | Sugimoto et al. | 361/749 |
| 5,502,615 | 3/1996 | Kubota et al. | 361/752 |

*Primary Examiner*—Gregory D. Thompson
*Attorney, Agent, or Firm*—Sughrue, Mion, Zinn, Macpeak & Seas, PLLC

[57] ABSTRACT

On a rear surface of a cluster bezel, a module circuit body is formed with, for example, an FPC (flexible printed circuit). Thereafter, on the rear surface of the cluster bezel, an instrument board, a right-side switch section, and a left-side switch section are mounted. In this operation, connecting terminals on a base board provided for the instrument board, the right-side switch section, and the left-side switch section are brought into contact with the contact portions of the FPC, so that the meters on the instrument board are electrically connected to the right-side switch section and the left-side switch section.

11 Claims, 6 Drawing Sheets

CLUSTER MODULE AND ITS ASSEMBLING METHOD

BACKGROUND OF THE INVENTION

This invention relates to a cluster module which can be readily assembled and wired, and a method of assembling the cluster module.

It is well known in that art, for instance in mounting instruments, switches, etc. on the instrument panel of a motor vehicle, a cluster module formed by using a cluster bezel is mounted on the instrument panel.

With respect to a cluster module of this type, the present inventor has proposed a "meter module" disclosed in Japanese Patent Unexamined Publication No. Hei 7-96774. As shown in FIG. 9, the meter module 100 (renumbered) comprises: an instrument board 101 in which meters, display lamps, and their drive circuit are built; the drive circuit 102; a collective control circuit 103 including control circuits provided for mobile electrical units including the aforementioned meters, display lamps, etc.; and an electrical junction box 104 in which electrical wires are connected to apply electric power, input and output signals, and grounding to the mobile electrical units.

Further in FIG. 9, reference numerals 105 through 108 designate switches provided for head-lamps etc. Those switches 105 through 108 are fixedly fitted in mounting openings 110 in a rear frame 109 which is paired with a cluster bezel (or finished panel, not shown). Further in FIG. 9, reference numeral 111 designates an auxiliary wire harness which is provided for the module in addition to an in-panel harness. The auxiliary wire harness 111 has a module connecting connector 112 and an in-panel harness connecting connector 113 at the middle, and connectors 114 at both ends which are directly connected to electrical units. The meter module 100 thus designed is simple in arrangement.

On the other hand, in the case where a switch module 121 is mounted on the cluster bezel 120 as shown in FIG. 10, the switch module 121 is covered with a lid 122; that is, a box-shaped unit is formed. The box-shaped unit is fixedly mounted on the cluster bezel 120 with screws (not shown). A wire harness 123 is bundled, and fastened to the cluster bezel 120 by a pin 124, and a connector 125 of the wire harness 123 is connected to the cluster bezel 120.

The meter module 110 shown in FIG. 9 is advantageous in that it is simple in arrangement; however, it suffers from a problem that, since various parts must be mounted on the cluster bezel from both sides, the assembling work takes time and labor.

In the case of FIG. 10, the wire harness 123 must be laid being dragged in and out, as a result of which it may be damaged or at worst short-circuited. In addition, it is necessary to use the pin 124 to fixedly secure the wire harness. Those difficulty may occur with the above-described meter module 100.

SUMMARY OF THE INVENTION

Accordingly, an object of this invention is to eliminate the above-described difficulties. More specifically, an object of the invention is to provide a cluster module which can be readily assembled and wired, and which prevents the wire harness from being damaged or short-circuited, and which is reduced in the number of components, and a method of assembling the cluster module.

The foregoing object of the invention has been achieved by the provision of a cluster module, which, according to one aspect of the invention, comprises:

a cluster bezel to be mounted on an instrument panel;

a circuit body formed on the rear surface of the cluster bezel; and electronic components which are mounted or the rear surface of the cluster bezel, and electrically connected to the circuit body.

In the cluster module, the circuit body is formed on the rear surface of the cluster bezel, and it is connected to the switch module. This feature eliminates the difficulty accompanying the prior art that the wire harness is dragged in and out when laid, and accordingly it is damaged and at worst short-circuited.

In the cluster module, preferably the circuit body is a flexible printed circuit.

In the cluster module, the circuit body is the flexible printed circuit. Hence, it can be formed with ease.

In the cluster module, preferably the circuit body is formed by double-slot molding.

In the cluster module, the circuit body is formed by double-shot molding, and therefore it can be readily formed.

Furthermore, in the cluster module, preferably the circuit body is formed by plating.

In the cluster module, the circuit body is formed by plating, and therefore it can be formed with ease.

Moreover, the above-described object of the invention has been achieved by the provision of a method of assembling a cluster module, in which, according to another aspect of the invention, after a circuit body is formed on the rear surface of a cluster bezel to be mounted on an instrument panel, electronic component are mounted on the rear surface of the cluster bezel, and the electronic components are electrically connected to the circuit body.

As was described above, in the method, after the circuit body is formed on the rear surface of the cluster bezel, the electronic components are electrically connected to the circuit body. This feature eliminates the difficulty accompanying the prior art that the wire harness is dragged in and out when laid, and simplifies the installation of the electronic components.

DETAILED DESCRIPTION OF THE INVENTION

A cluster module according to the invention, and its assembling method will be described with reference to the accompanying drawings.

Figure 1:
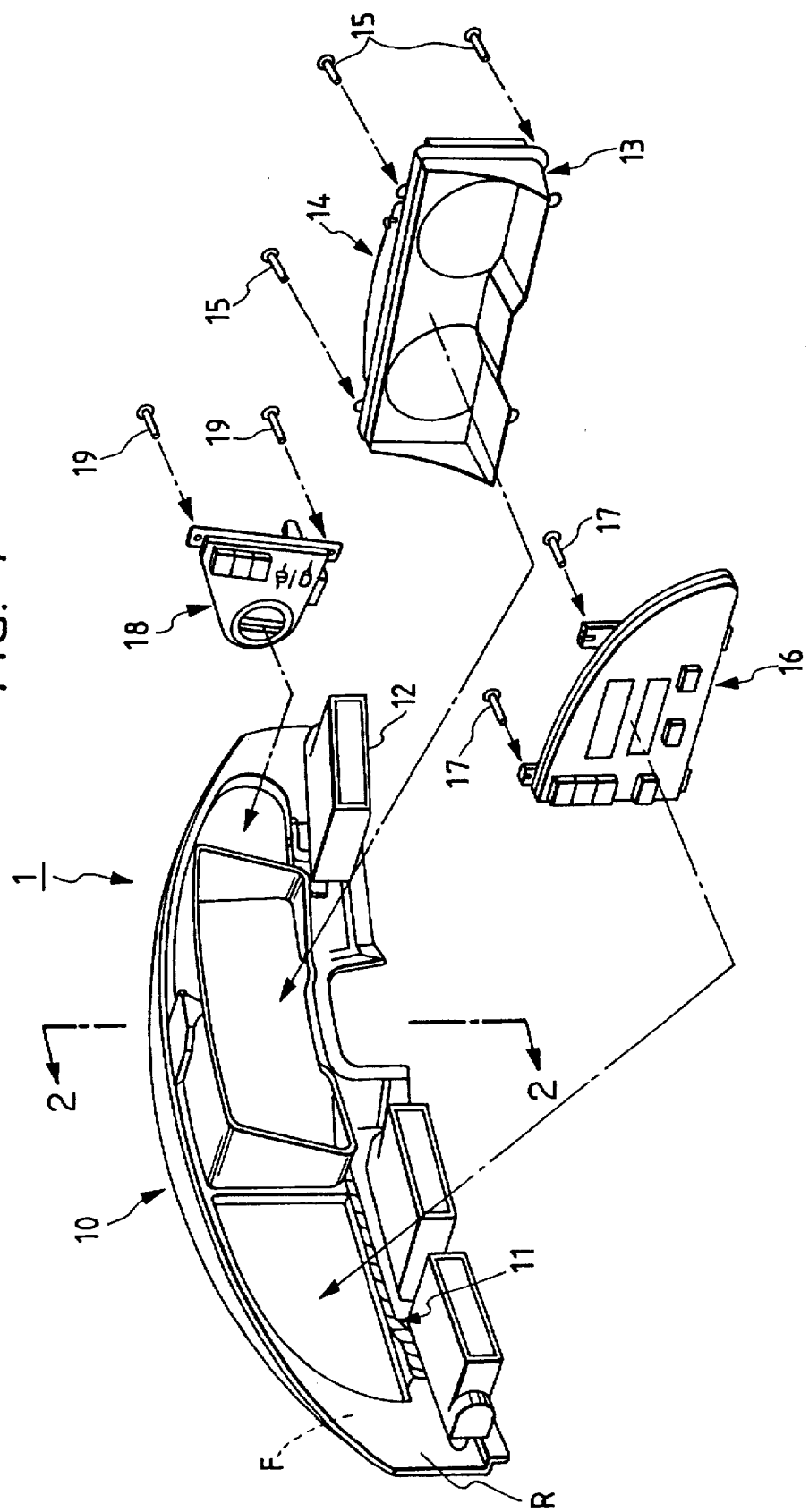
FIG. 1 is an exploded perspective view of a cluster module according to the invention.
Figure 2:
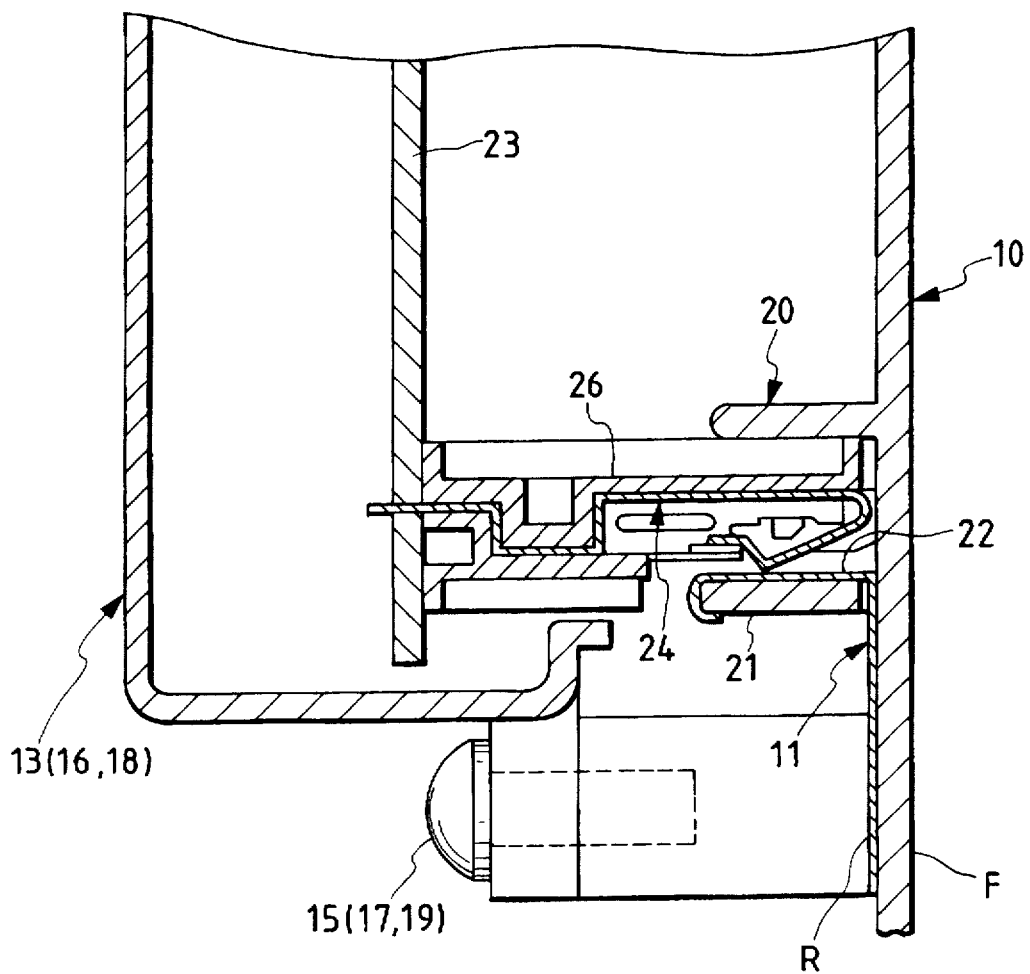
FIG. 2 is a sectional view taken along line 2—2 in FIG. 1.
Figure 3:
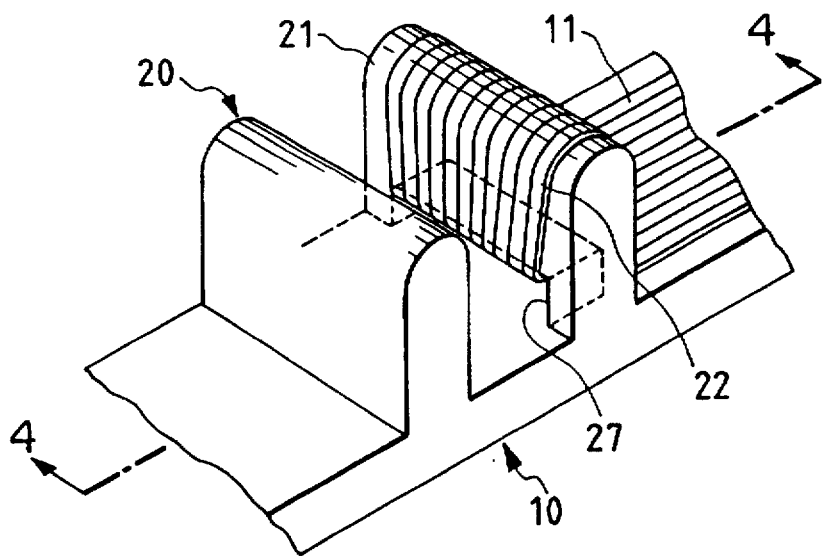
FIG. 3 is a perspective view showing an FPC (flexible printed circuit) in the cluster module of the invention.
Figure 4:
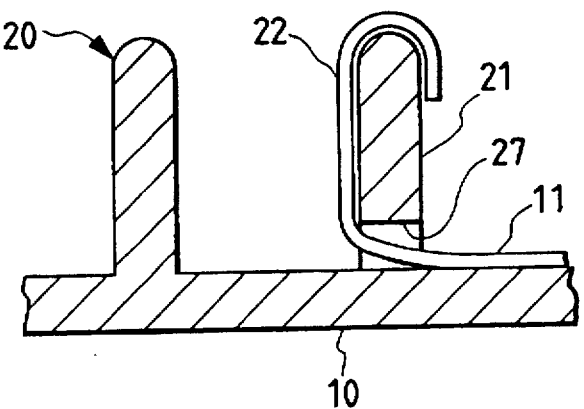
FIG. 4 is a sectional view taken along line 4—4 in FIG. 3.
Figure 5:
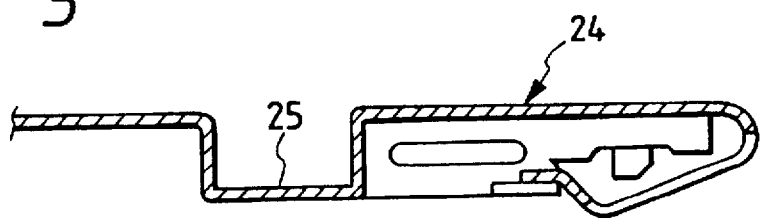
FIG. 5 is a diagram showing a surface contact terminal of the cluster module according to the invention.
Figure 6:
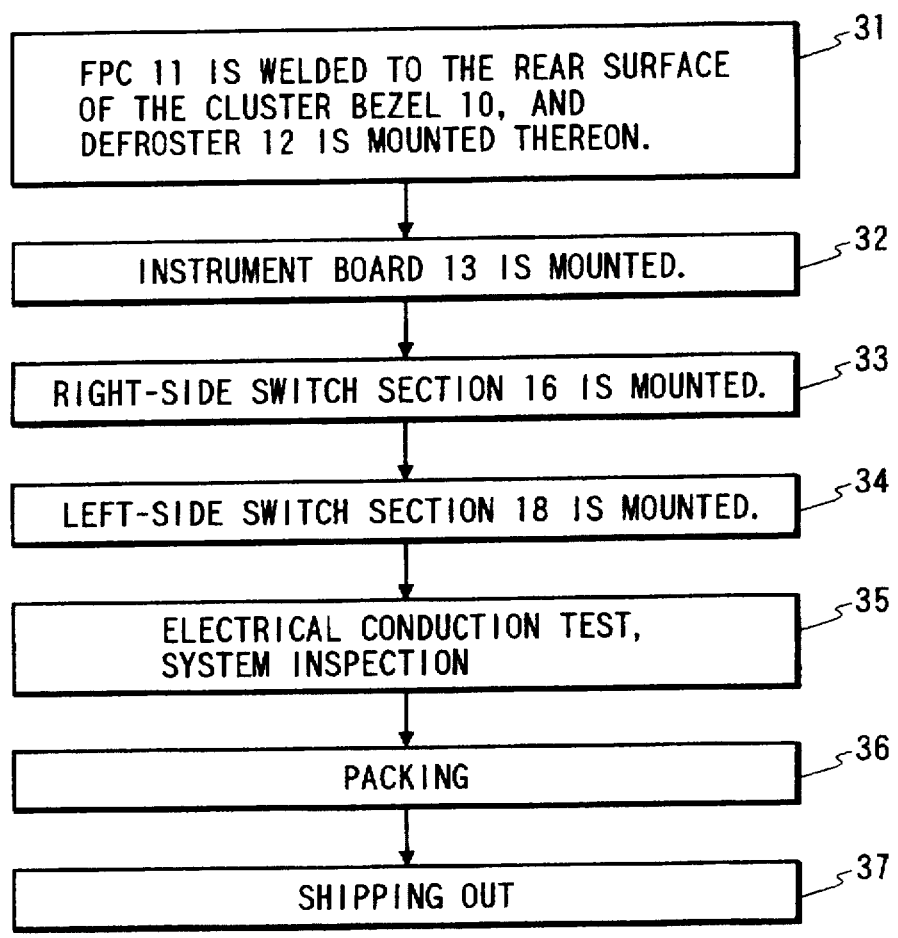
FIG. 6 is a diagram showing a procedure of assembling the cluster module according to the invention.
Figure 7:
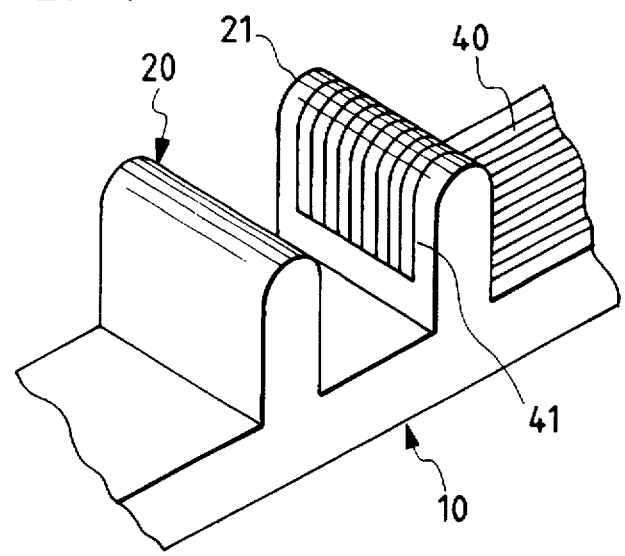
FIG. 7 is a perspective view showing a plated circuit in plating the cluster module according to the invention.
Figure 8:
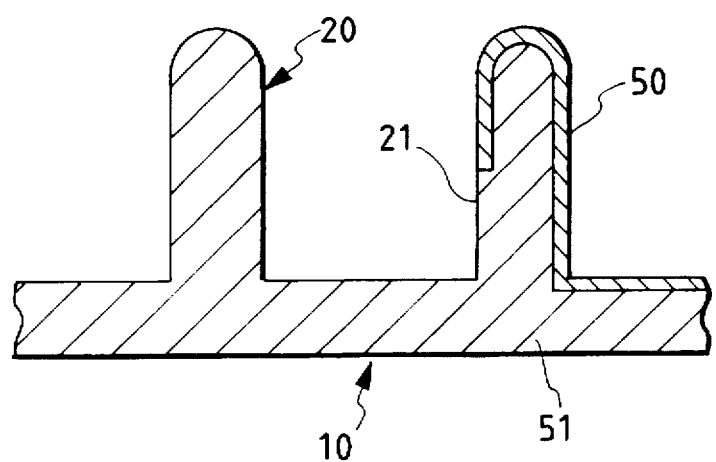
FIG. 8 is a sectional view showing a module circuit body formed by double-shot molding.
Figure 9:
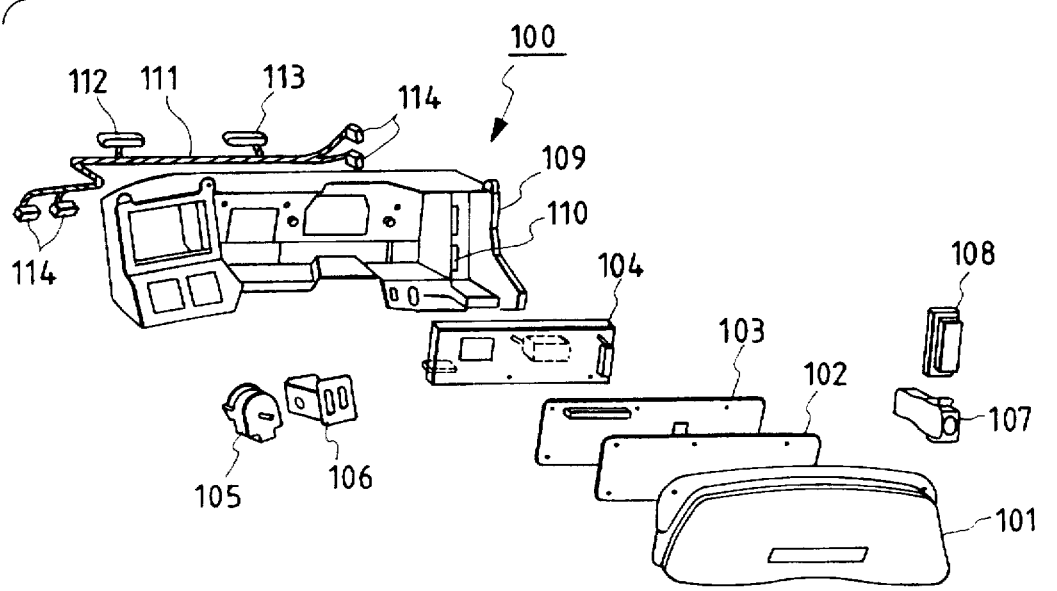
FIG. 9 is a diagram showing a first example of a conventional cluster module.
Figure 10:
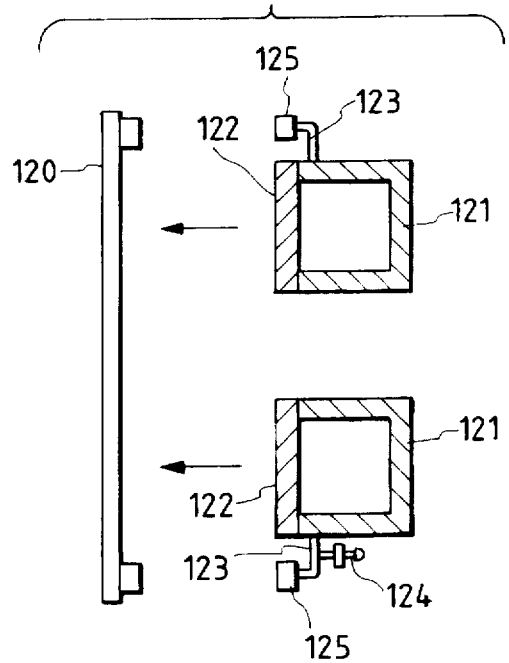
FIG. 10 is a diagram showing a second example of the conventional cluster module.

FIG. 1 is an exploded perspective view of the cluster module according to the invention, FIG. 2 is a sectional view taken along line 2—2 in FIG. 1, FIG. 3 is a perspective view showing an FPC (flexible printed circuit) in the cluster module of the invention, and FIG. 4 is a sectional view taken along line 4—4 in FIG. 3. Furthermore, FIG. 5 is a diagram showing a surface contact terminal in the cluster module according to the invention, FIG. 6 is a diagram showing a procedure of assembling the cluster module according to the invention, FIG. 7 is a perspective view showing a plated circuit in the cluster module according to the invention, and FIG. 8 is a sectional view showing a module circuit body formed by double-shot molding.

The cluster module 1 of the invention is shown in FIG. 1. In FIG. 1, reference numeral 10 designates a cluster bezel mounted on an instrument panel (not shown) of a motor vehicle; and 11, a module circuit body, namely, an FPC (flexible printed circuit) 11 is welded to the rear surface (R) of the cluster bezel 10 at predetermined position along the protrusions on the rear surface. The FPC 11 is formed through insert molding fused concurrently with formation of the bezel in a state of temporary fixation to a metal mold. On the other hand, a defroster 12 is mounted on the rear surface of the cluster bezel 10.

On the other hand, an electronic module 14 is mounted on the rear surface of an instrument board 13 having a variety of meters. The instrument board 13 is fixedly mounted on the rear surface of the cluster bezel 10 at the middle with screws 15. In addition, a right-side switch section 16 is fixedly secured to one end portion of the rear surface of the cluster bezel with screws 17, while a left-side switch section 18 to the other end portion of the rear surface with screws 19.

The right-side switch section 16 includes a hazard switch, a clock switch, an air conditioner switch, and an audio satellite switch which are operated by a driver or a passenger, whereas the left-side switch section 18 includes light switches such as a main light switch, a fog lamp switch, and an automatic lamp switch which are operated by the driver only.

The cluster bezel 10 has a connector guide section 20 on the rear surface which is U-shaped in section. Contact portions 22 of the FPC 11 are provided on the inner surface of one guide rail 21 of the connector guide section 20.

As shown in FIG. 3, the guide rail 21 has a through-hole 27 formed in its base portion, and the contact portions 22 are inserted into the through-hole 27 from outside and extended along the inside of the guide rail 21. The contact portions 22, as shown in FIG. 4, are bent over the outer end portion of the guide rail 21 in such a manner as to embrace it.

On the other hand, as shown in FIG. 2, a base board 23 is provided for the instrument board 13, the right-side switch section 16, and the left side switch section 18. The base board 23 has a connector 26 which has surface-contact terminals 24 which are brought into contact with the contact portions 22 of the FPC 11.

Simultaneously when the instrument board 13, the right-side switch section 16, and the left-side switch selection 18 are mounted on the rear surface of the cluster bezel 10, the surface contact terminals 24 are brought into contact with the contact portions 22 of the FPC 1, so that the meters on the instrument board 13 are electrically connected to the switches of the right-side switch section 16, and those of the left-side switch section 18.

Each of the surface contact terminals 24 includes a U-shaped stress absorbing portion 25 as shown in FIG. 5. Hence, even if the connector guide portion 20 and the surface contact terminals 24 are somewhat shifted in position from each other, the surface contact terminals 24 can be readily inserted in the connector guide section 20.

The cluster module 1 thus designed can be assembled according to an assembling procedure shown in FIG. 6.

First, the FPC 11 is welded to the rear surface of the cluster bezel 10, and the defroster 12 is mounted thereon (Step 31).

Next, the instrument board 13, the right-side switch section 16, and the left-side switch section 18 are mounted on the rear surface of the cluster bezel 10 (Steps 32 through 34), so that the surface contact terminals 24 of the base board 23 provided for the instrument board 13, the right-side switch section 16 and the left-side switch section 18 are brought into contact with the FPC 11.

Under this condition, an electrical conduction test, and a system inspection are carried out (Step 35). Thus, the cluster module has been manufactured. Thereafter, it is packed (Step 36), and then shipped out (Step 37).

As was described above, in the cluster module 1, the FPC 11, which is the module circuit body, is provided on the rear surface of the cluster bezel 10; and the instrument board 13, the right-side switch section 16, and the left-side switch section 18 are also mounted on the rear surface of the cluster bezel 10, which makes it possible to readily install the electrical components.

With the cluster module of the invention, unlike the conventional one, it is unnecessary to drag in and out the wire harnesses. Accordingly, the cluster module of the invention is free from the difficulty that the wire harness is damaged and at worst short-circuited. Furthermore, the cluster module of the invention dispenses with the wire harness and accordingly the pins for fixing it, which results in a reduction in the number of components.

In the above-described embodiment of the invention, the module circuit body is the FPC 11; however, the invention is not limited thereto or thereby. That is, the module circuit body may be formed of a plated circuit 40 which is formed by plating as shown in FIG. 7. In this case, the plated circuit 40 is extended over the guide rail 21 in such a manner that its end portion embraces the guide rail 21, thus providing contact portions 41 which are brought into contact with the surface contact terminals 24 (FIG. 2). In addition, as shown in FIG. 8, a module circuit body 50 may be formed by double-shot molding (so-called "MID (Molded Interconnection Device) molding method") in which a material capable of making plating and a material incapable of making plating are integrally formed on the surface of the bezel through two shots. According to this double-shot molding, the module circuit body 50 having contact portions which are brought into contact with the surface contact terminals 24 (FIG. 2), are made of electrically conductive material; whereas the cluster bezel body 51, on which the module circuit body 50 is formed, is made of electrically non-conductive material.

The formation of the module circuit body can be readily achieved by plating or double-shot molding.

As was described above, the cluster module of the invention comprises: a cluster bezel to be mounted on an instrument panel; a circuit body formed on the rear surface of the cluster bezel; and electronic components which are mounted on the rear surface of the cluster bezel, and electrically connected to the circuit body.

Accordingly, in the cluster module, the circuit body is formed on the rear surface of the cluster bezel, and it is connected to the electronic components. This feature eliminates the difficulty accompanying the prior art that, when laid, the wire harness is damaged and at worst short-circuited while being dragged in and out. In addition, the cluster module dispenses with the wire harness and accordingly its mounting pins. Hence, the cluster module is reduced in the number of components and in total weight as much, and the electronic components can be installed with ease.

In the cluster module, the circuit body may be formed of a flexible printed circuit. Hence, the circuit body can be readily formed.

In the cluster module, the circuit body may be formed by plating, and therefore it can be formed with ease.

In the cluster module, the circuit body may be formed by double-shot molding, and therefore it can be readily formed.

In the method of assembling the cluster module, after the circuit body is formed on the rear surface of the cluster bezel to be mounted on the instrument panel, the electronic components are mounted on the rear surface of the cluster bezel, and the electronic components are electrically connected to the circuit body.

Accordingly, in the method, after the circuit body is formed on the rear surface of the cluster bezel, the electronic components are connected to the circuit body. This feature eliminates the difficulty accompanying the prior art that, when laid, the wire harness is dragged in and out, and simplifies the installation of the electronic components.

What is claimed is:

1. A cluster module, comprising:
   a cluster bezel having guide means disposed on a rear surface of said cluster bezel;
   a bezel circuit disposed on said cluster bezel and having a first electrical contact portion integrally configured with said guide means of said cluster bezel; and
   an electronic component having corresponding guide means engageable with said guide means of said cluster bezel, and having a second electrical contact portion for contacting said first electrical contact portion;
   wherein upon coupling of said guide means, said second electrical contact portion contacts said first electrical contact and electrically connects said electronic component to said bezel circuit.

2. A cluster module according to claim 1, wherein said bezel circuit is a flexible printed circuit.

3. A cluster module according to claim 1, wherein said bezel circuit is a plated circuit.

4. A cluster module according to claim 1, wherein said cluster bezel is provided with a bezel aperture through which a portion of said electronic component is exposed.

5. A cluster module according to claim 1, wherein said guide means of said cluster bezel comprises a pair of guide rails extending away from said rear surface of said cluster bezel to define a channel,
   said bezel circuit extends into an interior of said channel such that said first electrical contact portion is provided on an inside surface of one of said pair of guide rails.

6. A cluster module according to claim 5, wherein said corresponding guide means comprises a connector supporting a surface contact terminal, and said surface contact terminal forms said second electrical contact portion.

7. A cluster module according to claim 6, wherein said surface contact terminal includes a u-shaped stress absorbing portion interposed between an end of said surface contact terminal and said second electrical contact portion.

8. A cluster module according to claim 5, wherein said bezel circuit extends through a guide rail aperture provided in a base portion of one of said pair of guide rails.

9. A cluster module according to claim 5, wherein said bezel circuit extends along an outside surface of one of said pair of guide rails.

10. A method of assembling a cluster module, comprising the steps of:
    forming a bezel circuit on a surface of a cluster bezel having an aperture therein and including guide means, such that a first electrical contact portion of said bezel circuit is integrally configured with said guide means; and
    mounting an electronic component having corresponding guide means and a second electrical contact portion in said aperture of said cluster bezel;
    wherein upon mounting of said electronic component, said guide means couple such that said second electrical contact portion contacts said first electrical contact portion, thereby electrically connecting said electronic component to said bezel circuit.

11. A method of assembling a cluster module according to claim 10, wherein said bezel circuit is formed by double-shot molding.

* * * * *